United States Patent
Kubo et al.

[11] Patent Number: 5,852,686
[45] Date of Patent: Dec. 22, 1998

[54] MANUALLY OPERABLE DOCUMENT READING DEVICE FOR AN IMAGE FORMING APPARATUS

[75] Inventors: Shinya Kubo; Tetsuichiro Yamamoto, both of Tokyo; Yasushi Matsumoto, Shizuoka, all of Japan

[73] Assignee: NEC Corporation, Tokyo, Japan

[21] Appl. No.: 731,129

[22] Filed: Oct. 10, 1996

[30] Foreign Application Priority Data

Oct. 11, 1995 [JP] Japan ................................. 7-263004

[51] Int. Cl.⁶ ................................................. G06K 9/18
[52] U.S. Cl. .......................... 382/313; 382/314; 382/315; 358/473; 235/472
[58] Field of Search .................................... 382/313, 314, 382/315, 312; 358/473; 235/472

[56] References Cited

U.S. PATENT DOCUMENTS

| | | | |
|---|---|---|---|
| 4,860,377 | 8/1989 | Ishigaki | 382/59 |
| 5,068,913 | 11/1991 | Sugiura | 382/61 |
| 5,121,226 | 6/1992 | Kubota et al. | 358/473 |
| 5,365,605 | 11/1994 | Hosogoe et al. | 382/59 |
| 5,602,379 | 2/1997 | Uchimura et al. | 235/472 |

FOREIGN PATENT DOCUMENTS 4-361472  12/1992  Japan ............................ H04N 1/04

*Primary Examiner*—Leo H. Boudreau
*Assistant Examiner*—Ishrat Sherali
*Attorney, Agent, or Firm*—Sughrue, Mion, Zinn, Macpeak & Seas, PLLC

[57] ABSTRACT

An image reading device, particularly a hand scanner, capable of setting a reading position in the main scanning direction accurately at all times. A stage glass is affixed to the reading surface of the hand scanner. A reference line is printed on the stage glass outside of the valid reading range of a CCD (Charge Coupled Device) image scanner. For the adjustment of the valid reading range, the image sensor and a lens are roughly adjusted such that data representative of the reference line appears at the edge of the valid reading range. Subsequently, the valid reading range is electrically shifted in the main scanning direction such that the reference line disappears.

18 Claims, 4 Drawing Sheets

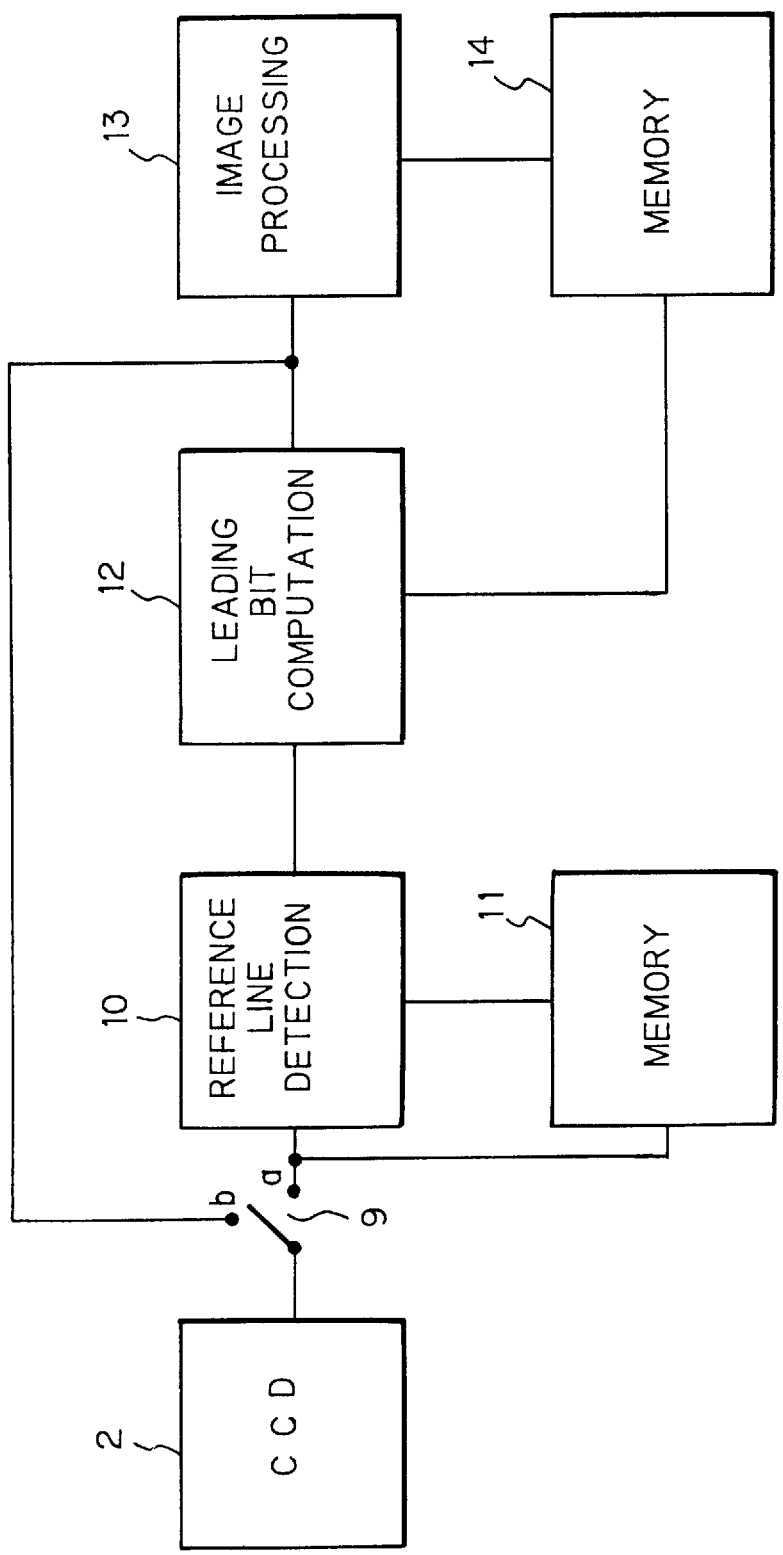

MANUALLY OPERABLE DOCUMENT READING DEVICE FOR AN IMAGE FORMING APPARATUS

BACKGROUND OF THE INVENTION

The present invention relates to a document reading device for a facsimile apparatus, printer or similar image forming apparatus and, more particularly, to a hand scanner or similar document reading device capable of reading image data out of a document by manual operation.

A document reading device for the above application includes a light-sensitive device usually implemented as a CCD (Charge Coupled Device) image sensor. The problem with the device using a CCD image sensor is that the reading position of the image sensor in the main scanning direction is apt to deviate due to irregularities in optics including a lens and a mirror. For adjustment of the reading position in the main scanning direction, it has been customary for an operator to shift a CCD board little by little by hand or with a just while observing an output waveform representative of an exclusive test chart, until the board reaches a preselected reading position.

A document reading device having an automatic adjusting capability is disclosed in, e.g., Japanese Patent Laid-Open Publication No. 4-361472. This kind of arrangement successfully works so long as its scanner section is built in the body of an image forming apparatus, e.g., facsimile apparatus. However, such an arrangement is problematic when it comes to a hand scanner or similar hand-operated document device, i.e., a scanner separated from the apparatus body which is manually operated to scan a document.

SUMMARY OF THE INVENTION

It is therefore an object of the present invention to provide a document reading device, for an image forming apparatus, which is capable of setting a reading position in the main scanning direction accurately at all times.

In accordance with the present invention, a device for reading image data out of a document by manual operation includes an image sensor. A lens focuses an image adjacent a reading surface to the image sensor. A transparent member is affixed to the reading surface to extend in the main scanning direction, and has a mark positioned outside of the valid reading range of the image sensor. An adjusting defice adjusts the valid reading range of the image sensor on the basis of the position of the mark.

Also, in accordance with the present invention, a device for reading image data out of a document by manual operation has an image sensor. A lens focuses an image adjacent a reading surface to the image sensor. A transparent member is affixed to the reading surface to extend in the main scanning direction, and has a mark positioned outside of the valid reading range of the image sensor. An adjusting device adjusts, at the time of adjustment of the valid reading range, the position of the image sensor or the position of the lens such that data representative of the mark appears at the edge of the valid reading range. A shifting device shifts, after the adjustment by the adjusting device, the valid reading range such that the mark disappears from image data.

BRIEF DESCRIPTION OF THE DRAWINGS

The above and other objects, features and advantages of the present invention will become apparent from the following detailed description taken with the accompanying drawings in which:

FIG. 3 is a block diagram schematically showing an alternative embodiment of the present invention.

DESCRIPTION OF THE PREFERRED EMBODIMENTS

Figure 4:
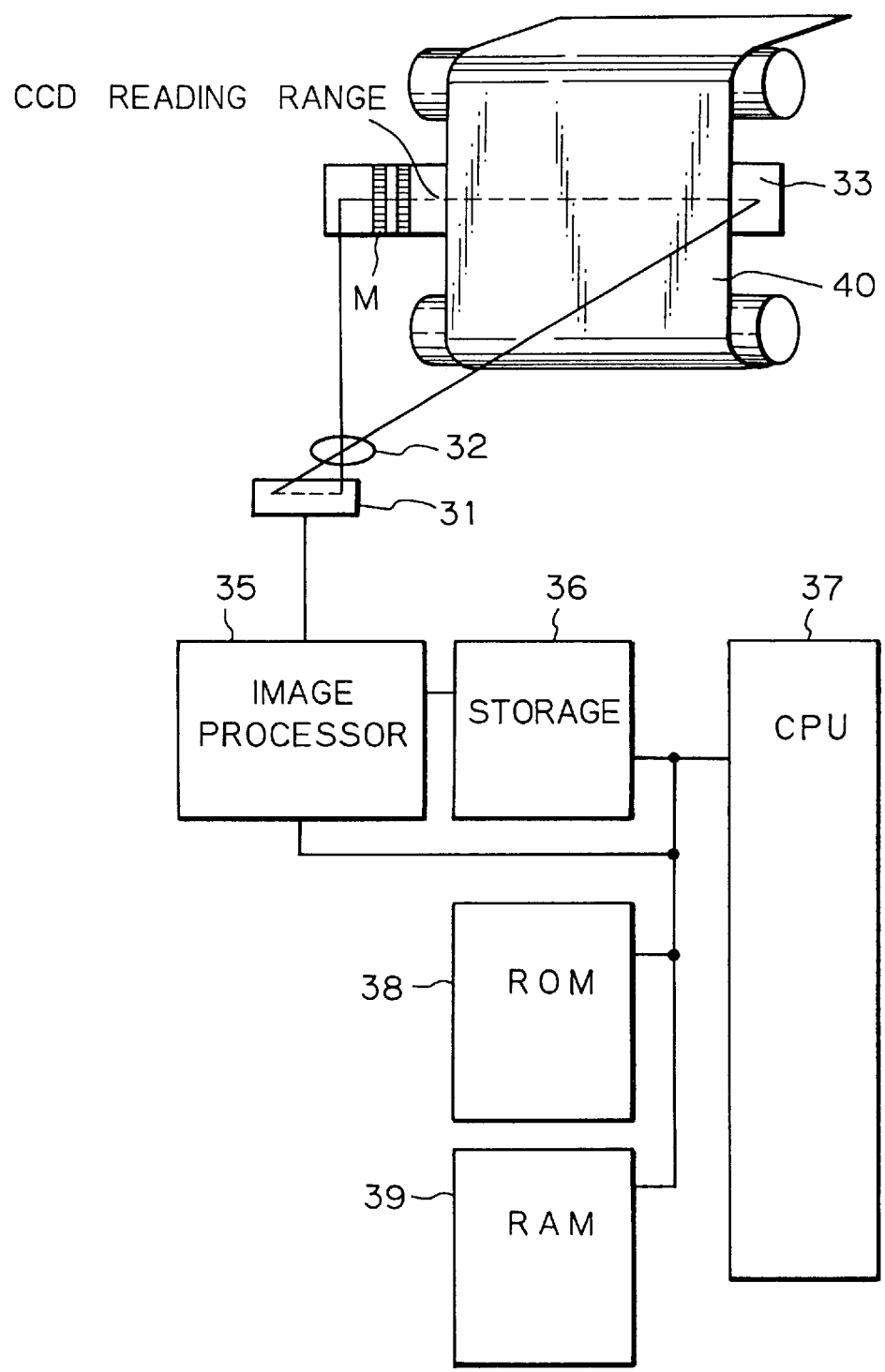
FIG. 4 shows a conventional document reading device.

To better understand the present invention, a brief reference will be made to a conventional document reading device, shown in FIG. 4. The device to be described is taught in Japanese Patent Laid-Open Publication No. 4-361472 mentioned earlier. As shown, the device has a CCD image sensor 31 and a white plate 33 provided with a reference mark M in the range which the image sensor 31 can read. The white plate 33 faces the light-sensitive surface of the image sensor 31 with a document 40 therebetween. In this condition, the reading range of the image sensor 31 is determined on the basis of the reference mark M. Specifically, the image sensor 31 outputs one line of image data read out of the white plate 33. The image data are input to an image processor 35. The image processor 35 binarizes the input image data and writes the binary image data in a storage 36. A CPU (Central Processing Unit) 37 detects the position of the mark M on the basis of the binary image data, adds the distance between the mark M and the adjoining edge of the document 40 to the position of the mark M, and then causes the edge of the document 40 to be positioned at the left edge of the valid data range. The CPU 47 performs the above computation with a ROM (Read Only Memory) 38 and a RAM (Random Access Memory) 39. The reference numeral 32 designates a lens.

The above arrangement successfully works so long as its scanner section is built in the body of an image forming apparatus, e.g., facsimile apparatus. However, when it comes to a hand scanner or similar reading device separated from the apparatus body and used to read a document by hand, the distance between the reading surface of its scanner section and the document as well as between it and the reference white plate varies. Specifically, when the hand scanner reads a document, floating occurs between the document and the reading surface of the scanner, causing the distance to vary. Moreover, the positional relation between the document and the reading surface differs from the case where the scanner is mounted on the apparatus body to the case where it is operated by hand.

Therefore, when a reference for setting the reading position is printed on an exclusive test chart or on a white plate facing the reading surface of the apparatus body, the positional relation between the reference position and the actual reading range is not unconditionally determined. In addition, a deviation occurs between the desired reading position and the reference position due to, e.g., positional deviation between the test chart and the reading section of the scanner, positional deviation between the scanner section and the apparatus body in the main scanning direction, and irregularities in distance. As a result, an accurate reading position is not achievable.

Figure 1:
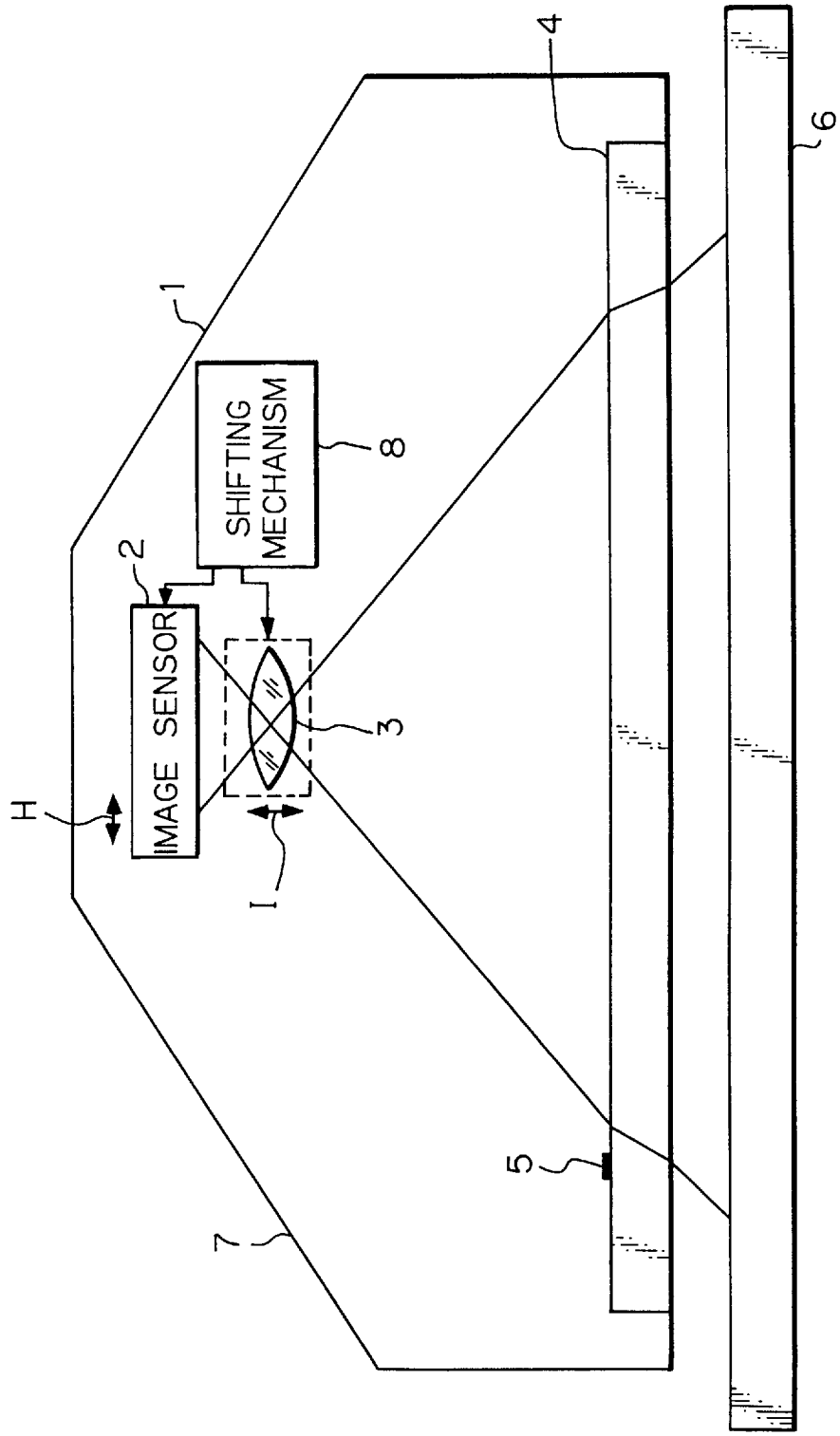
FIG. 1 is a section of optics included in a document reading device embodying the present invention.

Referring to FIG. 1, optics representative of an image reading device embodying the present invention is shown and implemented as a hand scanner 1. Assume that the hand scanner 1 is connected to a facsimile apparatus, not shown, as an example of a document reading means. The scanner 1 includes a light source, not shown, for illuminating the surface of a document. The resulting reflection from the document is incident to a CCD image sensor 2 via a lens 3. A stage glass 4 is affixed to the reading surface of the scanner 1 and extends in the main scanning direction. The image sensor 2, lens and stage glass 4 are accommodated in a casing 7. The image sensor 2 is movable in a direction parallel to the main scanning direction, as indicated by a double headed arrow H. The lens 3 is movable in the direction H together with the image sensor 2, and in addition in a direction I perpendicular to the direction H for varying the focal distance. For such movement, use may be made of a slidable plate and a fastening screw. A shifting mechanism 8 realizes the movement of the image sensor 2 and the lens 3.

Reference white 6 extends on the facsimile apparatus in the main scanning direction. The reference white 6 may be implemented by a white document broader than the reading range of the image sensor 2 in the main scanning direction, or a white plate so mounted on the apparatus body as to face the reading surface of the scanner 2.

A reference mark in the form of a line 5 is printed on the surface of the stage glass 4 opposite to the surface along which a document moves. The reference line 5 is positioned outside of the valid reading range of the image sensor 5. The reference line 5 has a width in the main scanning direction determined to be, e.g., 1 mm, assuming that the resolution of the image sensor 2 is 200 dpi (dots per inch).

Because the positional relation between the image sensor 2 and the stage glass 4 is fixed within the casing 7, all the disturbance factors including dislocation relative to the apparatus body are excluded.

Figure 2A:
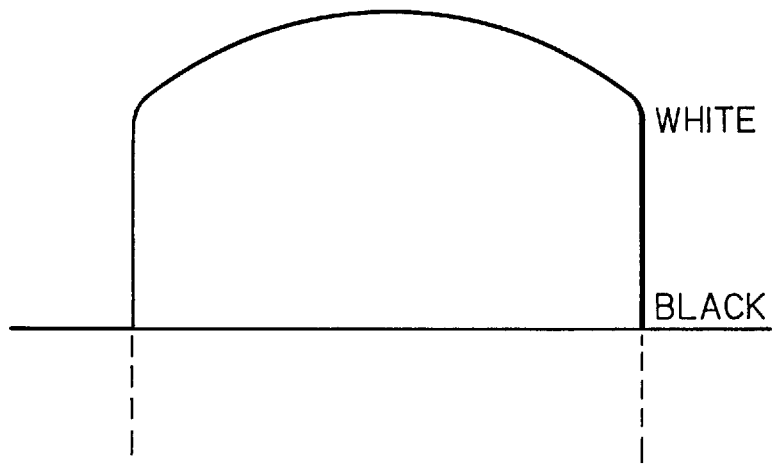
FIG. 2A shows the output of a CCD image sensor included in the embodiment and in which a reference line does not appear.
Figure 2B:
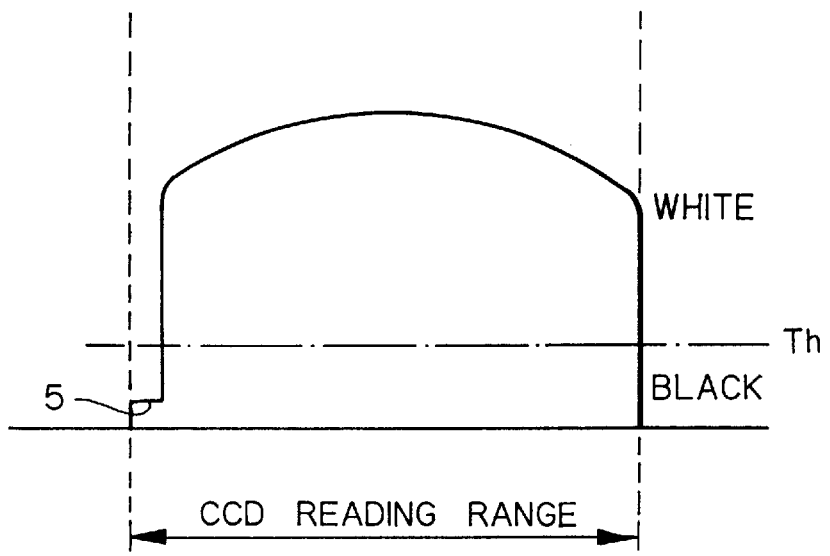
FIG. 2B shows the output of the CCD image sensor in which the reference line appears.

At the time of forwarding of the facsimile apparatus, the hand scanner 1 is caused to read the reference white 6 for the adjustment of the valid reading range of the image sensor 2. FIGS. 2A and 2B each show a particular waveform output from the image sensor 2 and derived from the reference white 6. The image sensor 2 and lens 3 are respectively shifted in the directions H and I by the shifting mechanism 8 such that the line 5 is located outside of the valid reading range, i.e., such that the image sensor 2 produces only a white output, as shown in FIG. 2A. The shift of the lens 3 in the direction I is effected to adjust the focal distance. By the above adjustment, the valid reading range of the image sensor 2 remains adequate at all times. In this case, the first bit of the image sensor 2 is the leading bit of the valid reading range.

Even when the reference line 5 does not appear in the output of the image sensor 2, as shown in FIG. 2A, the image sensor 2 is not always set in its normal valid reading range, i.e., the valid reading range may have been noticeably deviated to the right on the stage glass 4, as viewed in FIG. 1. In light of this, the image sensor 2 and lens 3 are initially positioned such that the line 5 appears at the edge of the valid reading range, i.e., such that the sensor 2 outputs the waveform shown in FIG. 2B. At this instant, several leading bits of the valid reading width are black. In FIG. 2B, a line Th is representative of a threshold for distinguishing black and white.

The waveform shown in FIG. 2B indicates that the valid reading range of the image sensor 2 has not been accurately set. Therefore, additional adjustment is necessary for causing a bit several bits inward of the black output (right-hand side in the main scanning direction as viewed in FIG. 1) to turn out the leading bit of the valid reading range. Although this can be done by shifting the image sensor 2 and lens 3, the amount of adjustment is as small as several bits and extremely delicate. For the delicate adjustment, automatic processing is desirable, as follows.

FIG. 3 shows circuitry built in the device of FIG. 1 for automatically shifting the leading bit of the valid effective width. The circuitry to be described is representative of an alternative embodiment of the present invention. As shown, a switch 9 is connected to the output of the CCD 2. To adjust the valid reading range of the image sensor 2, the switch 9 is connected to a terminal 2. In this condition, one line of image data or waveform output from the image sensor 2 and shown in FIG. 2B is written to memory 11. A reference line detection 10 compares the output levels of the consecutive bits of the line stored in the memory 11 with the threshold Th and thereby binarizes them. Then, the detection 10 counts, based on the leading valid pixel bit output from the image sensor 2, the bits positioned at the right edge of the black portion in the main scanning direction. The count output from the detector 10 is fed to a leading bit computation 12.

The leading bit computation 12 adds a particular number of bits to the bit position at the right end of the reference line 5, i.e., the count output from the reference line detection 10. The computation 12 substitutes the resulting bit position for the leading bit of the valid reading range. The words "particular number of bits" refer to the number of bits corresponding to the distance between the left edge of the normal valid reading range on the surface opposite to the reading surface, as seen in FIG. 1, and the right end of the reference line 5. The position of the new leading bit is written to the memory 14. This completes the adjustment.

To read a document, the switch 9 is connected to a terminal b, so that the output of the image sensor 2 is fed to an image processing 13. The image processing 13 separates, based on the data stored in the memory 14 and representative of the leading bit of the valid reading range, only the data lying in the normal valid reading range in the main scanning direction from the one line of image data. Then, the image processing 13 processes the separated image data in the conventional manner.

As stated above, the initial rough adjustment brings the data representative of the reference line 5 to the edge of the valid reading range of the image sensor 2. Subsequently, the electric adjustment shifts the valid reading range in the main scanning direction. Such a procedure successfully sets up an accurate reading range. Because the adjustment is effected on the basis of the reference line 5 printed on the stage glass 4, it is not necessary to read a white plate with a mark or a test chart with a mark. The scanner 1 and reference line 5 are free from disturbance as to their positional relation.

The circuitry shown in FIG. 3 may be built in the hand scanner 1 shown in FIG. 1 or in the body of the facsimile apparatus, as desired. The stage glass 4 may be replaced with transparent acrylic resin or similar transparent material other than glass.

In summary, it will be seen that the present invention provides an image reading device, particularly handy image reading device, capable of determining a reading position within itself. This is because a reference for setting a reading range in the main scanning direction is implemented as a reference line or similar mark printed on a transparent member which is positioned at the reading surface of the device. Therefore, the device is free from disturbance factors including the irregular level of a document, deviation between the body of a facsimile apparatus and the scanner section in the main scanning direction, and irregularity in distance. The error as to the setting of the reading position is only the tolerance of the position of a stage glass and that of the reference line. The tolerance of the reading position can be reduced to below 0.3 mm.

Various modifications will become possible for those skilled in the art after receiving the teachings of the present disclosure without departing from the scope thereof.

What is claimed is:

1. A hand held device for reading image data out of a document, comprising:

a casing;

an image sensor attached to said casing;

a lens for focusing an image adjacent a reading surface to said image sensor;

a transparent member affixed to said casing to extend in a main scanning direction, and having a fixed mark positioned outside of a valid reading range of said image sensor, wherein said fixed mark is located at a fixed distance from said image sensor along a direction perpendicular to the main scanning direction; and adjusting means for automatically adjusting said valid reading range of said image sensor on the basis of a position of said fixed mark.

2. A device as claimed in claim 1, wherein said adjusting means comprises means for shifting said image sensor and said lens.

3. A device as claimed in claim 2, wherein said image sensor, said lens and said transparent member constitute a hand scanner for manually scanning the document.

4. A hand held device for reading image data out of a document, comprising:

a casing;

an image sensor attached to said casing;

a lens for focusing an image adjacent a reading surface to said image sensor;

a transparent member affixed to said casing to extend in a main scanning direction, and having a fixed mark positioned outside of a valid reading range of said image sensor, wherein said fixed mark is located at a fixed distance from said image sensor along a direction perpendicular to the main scanning direction; and adjusting means for automatically adjusting, at a time of adjustment of said valid reading range, a position of said image sensor or a position of said lens such that data representative of said fixed mark appears at an edge of said valid reading range; and shifting means for shifting, after adjustment by said adjusting means, said valid reading range such that said fixed mark disappears from image data.

5. A device as claimed in claim 4, wherein said shifting means comprises:

mark detecting means for detecting, when said device reads reference white, bits corresponding to a position of said mark out of one line of image signal output from said image sensor; and setting means for setting a leading bit of said valid reading range at a position shifted a particular number of bits away from said bits detected by said mark detecting means.

6. A device as claimed in claim 2, wherein said adjusting means adjusts said valid reading range by moving said image sensor with respect to said casing.

7. A device as claimed in claim 6, wherein said adjusting means adjusts said valid reading range by moving said lens with respect to said image sensor.

8. A device as claimed in claim 6, wherein said adjusting means moves said image sensor in a direction parallel to said main scanning direction.

9. A device as claimed in claim 2, wherein said adjusting means adjusts said valid reading range by moving said lens in two dimensions with respect to said casing.

10. A device as claimed in claim 4, wherein said adjusting means adjusts said valid reading range by moving said image sensor with respect to said casing.

11. A device as claimed in claim 10, wherein said adjusting means adjusts said valid reading range by moving said lens with respect to said image sensor.

12. A device as claimed in claim 10, wherein said adjusting means moves said image sensor in a direction parallel to said main scanning direction.

13. A device as claimed in claim 4, wherein said adjusting means adjusts said valid reading range by moving said lens in two dimensions with respect to said casing.

14. A hand held device for reading image data out of a document, comprising:

a casing;

an image sensor attached to said casing such that said image sensor is movable in one dimension with respect to said casing;

a lens attached to said casing such that said lens focuses an image to said image sensor;

a transparent member attached to said casing along a reading surface and extending in a main scanning direction, wherein said transparent member includes a fixed mark thereon positioned outside of a valid reading range of said image sensor, wherein said fixed mark is located at a fixed distance from said image sensor along a direction perpendicular to the main scanning direction;

a shifting mechanism connected to said image sensor and said lens; and an adjusting member for automatically adjusting said valid reading range of said image sensor on the basis of a position of said fixed mark.

15. A device as claimed in claim 14, wherein said lens is attached to said casing such that said lens is movable in two dimensions with respect to said casing.

16. A device as claimed in claim 15, wherein said image sensor is mounted to said casing such that said image sensor is movable in a direction parallel to said main scanning direction.

17. A device as claimed in claim 15, wherein said lens is mounted to said casing such that said lens is movable with respect to said image sensor.

18. A device as claimed in claim 17, wherein said lens is mounted to said casing such that said lens is movable, with respect to said image sensor, in a direction perpendicular to said main scanning direction.

* * * * *